United States Patent [19]

Kushita

[11] Patent Number: 5,765,104
[45] Date of Patent: Jun. 9, 1998

[54] APPARATUS AND METHOD FOR CONTROLLING AN INTERMITTENT RECEPTION TIME IN RADIO EQUIPMENT

[75] Inventor: Masayuki Kushita, Tokyo, Japan

[73] Assignee: NEC Corporation, Tokyo, Japan

[21] Appl. No.: 512,203

[22] Filed: Aug. 7, 1995

[30] Foreign Application Priority Data

Aug. 8, 1994 [JP] Japan ............................ 6-185574

[51] Int. Cl.⁶ ........................................ H04Q 7/18
[52] U.S. Cl. ........................................ 455/343; 370/311
[58] Field of Search ........................ 455/343, 38.3, 455/181.1, 574, 575; 340/825.44; 375/359; 370/311

[56] References Cited

U.S. PATENT DOCUMENTS

| 4,804,954 | 2/1989 | Macnak et al. .................. 370/311 |
| 5,428,820 | 6/1995 | Okada et al. ..................... 455/343 |
| 5,440,556 | 8/1995 | Edem et al. ..................... 455/38.3 |
| 5,459,457 | 10/1995 | Sharpe .............................. 370/311 |
| 5,542,117 | 7/1996 | Hendricks et al. ............... 455/343 |
| 5,678,227 | 10/1997 | Connell et al. ................... 370/311 |

FOREIGN PATENT DOCUMENTS 4-213229  8/1992  Japan .

*Primary Examiner*—Edward F. Urban
*Attorney, Agent, or Firm*—Sughrue, Mion, Zinn, Macpeak & Seas, PLLC

[57] ABSTRACT

A receiver making an intermittent reception detects a synchronization error between a code word value of a radio signal and a count value of a word counter, when detecting a synchronizing signal contained in the radio signal. When the error is consecutively detected at a predetermined number of times, the receiver adjusts a time to supply power to the radio circuit on the basis of this error.

12 Claims, 8 Drawing Sheets

APPARATUS AND METHOD FOR CONTROLLING AN INTERMITTENT RECEPTION TIME IN RADIO EQUIPMENT

BACKGROUND OF THE INVENTION

The present invention relates to an apparatus and a method for controlling an intermittent reception time in radio equipment and particularly to an apparatus and a method for controlling an intermittent reception time in a selective-calling receiver.

Radio equipment such as a selective-calling receiver (hereinafter referred to as a receiver) receives a radio signal composed of plural frames. Each frame includes plural code words. Each code word has an assigned synchronizing signal or an identification number.

A predetermined own identification number is assigned to a receiver in advance, and a received identification signal coinciding with a predetermined own identification number is inserted into some code words of some frames. A frame containing a code word having an inserted identification signal which coincides with the own identification number is called a self-frame.

The receiver supplies power to its radio circuit when receiving its self-frame, but does not supply power to the radio circuit when receiving any frame other than the self-frame. This power supply control system is called an intermittent reception system and can extend the lifetime of the battery used in it.

A receiver for making such an intermittent reception is described, for example, in Japanese Patent Application Laid-open Heisei 4-213229. This receiver is provided with a reference clock generator for generating a reference clock and a counter for counting the reference clock.

The receiver judges a time to receive a synchronizing signal in its self-frame by counting the reference clock with the counter, turns on the radio circuit at the time, and receives the synchronizing signal.

However, a receiver which receives a radio signal having a long period in transmission of frames has a long period in reception of self-frames and also has a long period in reception of synchronizing signals. Therefore, when the reference clock generator is poor in accuracy, the difference between a count value of the counter and a time to receive a frame containing a synchronizing signal is great.

Therefore, the receiver compensates the value of one period of the intermittent receiving action by compensating a count value of the counter when detecting a synchronizing signal.

In this manner, the receiver surely receives its self-frame by adjusting the time to receive a synchronizing signal of the next self-frame with a time corresponding to the detected error.

However, since the receiver described above compensates the value of one period of the intermittent receiving action each time a synchronizing signal contained in a self-frame is detected, the receiver has a problem that its power consumption is made greater and its battery life is made shorter in comparison with a receiver not making such a compensation.

Furthermore, the receiver of this patent application varies greatly in count values of the counter when the reference clock frequency coming from the reference clock generator is greatly changed because of a sudden change in the temperature. Therefore, since the receiver, which detects an error between a count value and a code word each time a synchronizing signal is detected, also detects a synchronization error between a suddenly changed count value and a code word and adjusts a point of time to receive a self-frame, it may incorrectly adjust a point of time to receive the next self-frame.

SUMMARY OF THE INVENTION

An object of the invention is to provide an apparatus and a method for controlling an intermittent reception time in radio equipment to extend the lifetime of the battery used in it.

Another object of the invention is to provide an apparatus and a method for controlling an intermittent reception time which can correctly adjust a point of time to receive a self-frame even in case a count value of its counter is suddenly changed.

Further, another object of the invention is to provide an apparatus and a method for controlling an intermittent reception time which adjusts a point of time to receive a frame assigned to the radio equipment when a synchronization error between a count value of the counter and a code word of a radio signal is consecutively detected at a predetermined number of times.

An apparatus for controlling an intermittent reception time in radio equipment of the invention is provided with an oscillator for generating a reference clock, a counter for counting the reference clock, a receiving circuit which receives a radio signal composed of plural frames and outputs the received signal, a synchronizing signal detecting means for detecting a synchronizing signal out of the received signal, a detector for detecting an error between a word value of the received signal and a count value of the counter in response to detection of the synchronizing signal, and an adjusting circuit which adjusts a margin time for starting the receiving circuit to receive a frame assigned to the receiver in case that the detector has consecutively detected the error at a predetermined number of times.

The apparatus may be also provided with an inhibiting circuit which inhibits the detecting circuit from making an error detection after a margin time for starting the receiving circuit has been adjusted by the adjusting circuit.

A controlling method for controlling an intermittent reception time in radio equipment of the invention comprises the following steps: supplying power to a receiving circuit for receiving a radio signal, detecting a synchronizing signal out of the radio signal, judging whether or not a compensation value to be used for adjusting a point of time to supply power to the receiving circuit has been stored in a compensation value storing circuit, setting a point of time to supply power to the receiving circuit on the basis of a compensation value when the compensation value has been stored in the compensation value storing circuit, detecting an error between the radio signal and a count value of the internal counter of the selective-calling radio receiver when no compensation value has been stored in the compensation value storing circuit, judging whether or not an already stored error exists in response to detection of an error, storing the detected error in an error storing circuit when no already stored error exists, judging whether or not a detected error coincides with an already stored error when the already stored error exists in the error storing circuit, rewriting an error stored in the error storing circuit with a detected error when the already stored error does not coincide with the detected error, judging whether or not the number of coincidences coincides with a predetermined number of consecutive error occurrences when the detected error coincides with the already stored error, and storing the error stored in the error storing circuit into a compensation value storing circuit as a compensation value when both of the numbers coincide with each other.

The controlling method of the invention may also include a method of inhibiting detection of an error between a radio signal and a count value of the internal counter of the radio equipment after storing a compensation value into the compensation value storing circuit.

By adopting the above-mentioned composition, the apparatus or method according to the invention adjusts a margin time for starting the receiving circuit to receive a frame assigned to the receiver on the basis of an error between a word value of a received signal and a count value of the counter when the error is consecutively detected at a predetermined number of times. Therefore, even when a count value of the counter is suddenly changed because of a sudden change in the temperature or the like, the invention makes it possible to exactly adjust a margin time for starting the receiving circuit without adjusting the margin time for starting the receiving circuit on the basis of an error at this time between the count value of the counter and the word value of the received signal.

Also, since the invention inhibits detection of an error between a radio signal and a count value of the counter or internal counter of the radio equipment after storing a compensation value in a memory or after adjusting a margin time for starting a receiving circuit by means of an adjusting circuit, the lifetime the equipment it can be extended.

BRIEF DESCRIPTION OF THE DRAWINGS

These and other objects, features and advantages of the invention will become more fully apparent from the following detailed description taken in conjunction with the accompanying drawings.

DETAILED DESCRIPTION OF THE PREFERRED EMBODIMENTS

Figure 1:
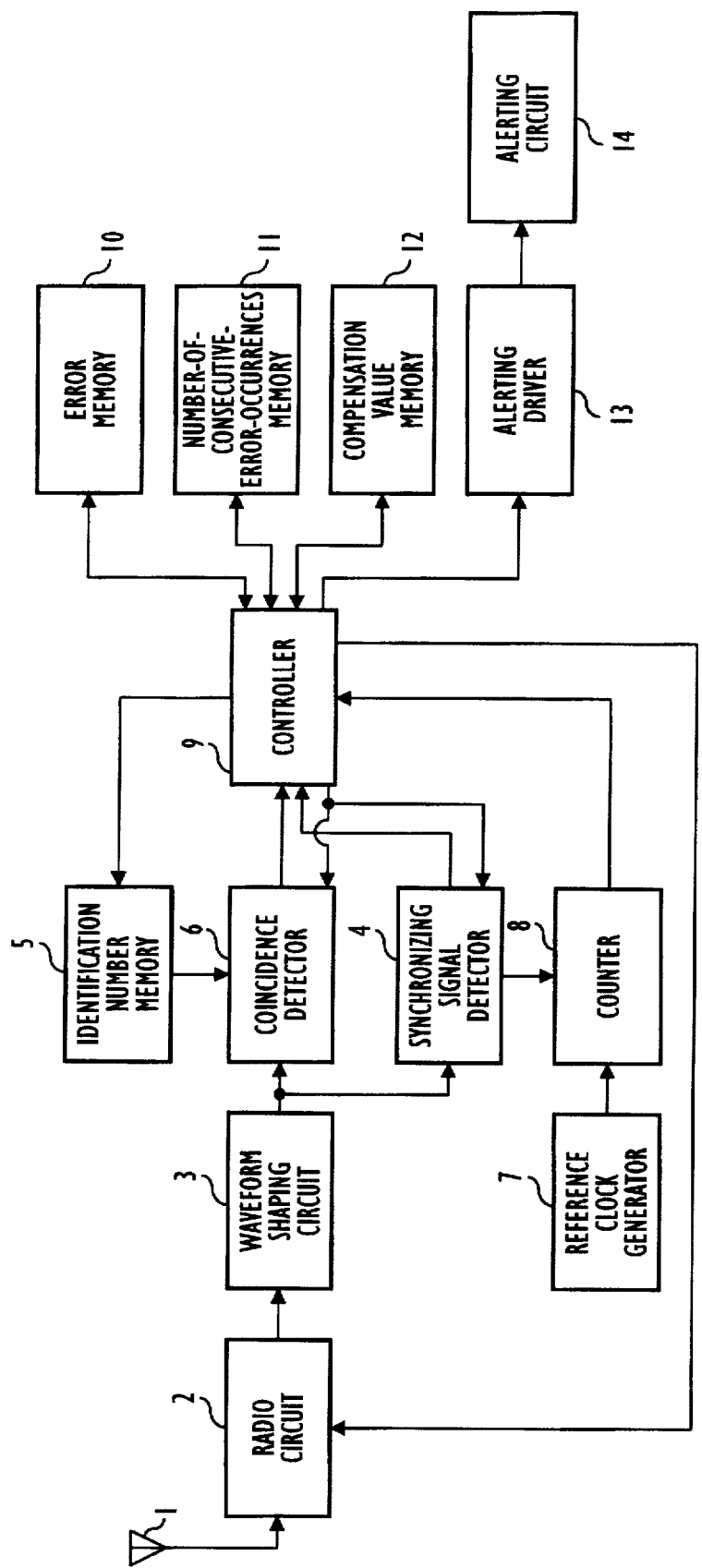
FIG. 1 is a functional block diagram of a selective-calling receiver showing an embodiment of the invention.

In FIG. 1, an antenna 1 receives a radio signal and outputs the received signal. A radio circuit 2 is controlled in an on-off mode by a radio circuit controlling signal from a controller 9. The radio circuit 2 amplifies the received signal, demodulates the amplified received signal, and outputs the demodulated signal. A waveform shaping circuit 3 outputs a digital signal obtained by shaping waveform of the demodulated signal to a synchronizing signal detector 4 and a coincidence detector 6.

The synchronizing signal detector 4, which is controlled in an on-off mode by the controller 9, detects a synchronizing signal out of the digital signals. When detecting a word synchronizing signal out of a synchronizing signal contained in a self-frame, the synchronizing signal detector 4 outputs a synchro-detection signal to the controller 9. And the synchronizing signal detector 4 outputs a synchro-establishment signal to a counter 8 through responding to detection of a word synchronizing signal and a frame synchronizing signal out of a synchronizing signal.

An identification number memory 5 outputs a predetermined own identification number at an address specified by the controller 9 to the coincidence detector 6.

The coincidence detector 6, which is controlled in an on-off mode by the controller 9, detects an identification signal out of the digital signals. The coincidence detector 6 judges whether or not the detected identification signal and the predetermined own identification number obtained from the identification number memory 5 coincide with each other. The coincidence detector 6 outputs a coincidence signal to the controller 9 in case of coincidence of both of them, but outputs no signal in case of no coincidence of them.

A reference clock generator 7 generates a reference clock and supplies it to the counter 8. The counter 8 counts the reference clock and compensates its count value by means of input of a synchro-establishment signal from the synchronizing signal detector 4.

The controller 9 responds to a synchro-detection signal from the synchronizing signal detector 4, detects an error between a count value of the counter 8 and a code word value and frame value of a received radio signal, and stores the detected error Z as an error Z0 in an error memory 10. The controller 9 judges whether or not the error Z0 stored in the error memory 10 has been consecutively detected at k times where k is the number of times stored in a number-of-consecutive-error-occurrences memory 11, and stores the error Z0 as a compensation value Z1 in a compensation value memory 12 when the error Z0 has been consecutively detected at k times.

The controller 9 judges whether or not the compensation value Z1 is stored in the compensation value memory 12, and turns on the radio circuit 2 by supplying a radio circuit controlling signal to the radio circuit 2 at a point of time as described later on the basis of this judgement and a count value of the counter 8.

The controller 9 outputs an alerting-driver signal to an alerting driver 13 in response to a coincidence signal from the coincidence detector 6, and turns off the radio circuit 2 by supplying a radio circuit controlling signal to the radio circuit 2 after outputting the alerting driver signal. Also, the controller 9 turns off the radio circuit 2 by supplying a radio circuit controlling signal to the radio circuit 2 when inputting no coincidence signal from the coincidence detector 6 by the time when reception of a self-frame is finished.

The error memory 10, the number-of-consecutive-error-occurrences memory 11, and the compensation value memory 12 are composed of RAM's. The error memory 10 stores an error Z0 from the controller 9 in it and outputs the stored error Z0 to the controller 9 according to an instruction from the controller 9. The number-of-consecutive-error-occurrences memory 11 stores the number k of consecutive error occurrences as described above in it and outputs the stored number k of consecutive error occurrences to the controller 9 according to an instruction from the controller 9. The compensation value memory 12 stores a compensation value Z1 from the controller 9 in it and outputs the stored compensation value Z1 to the controller 9 according to an instruction from the controller 9.

The alerting driver 13 outputs an alerting signal in response to an alerting driver signal. An alarting circuit 14 makes an alerting operation in response to the alerting signal.

Action of the counter 8 shown in FIG. 1 is described in the following as referring to FIG. 2.

Figure 2:
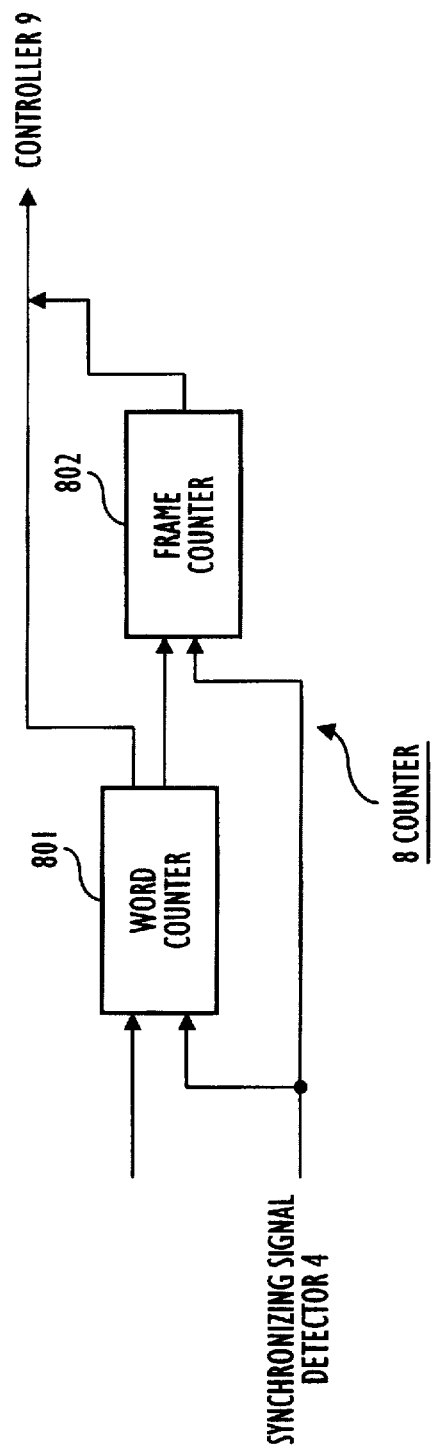
FIG. 2 is a functional block diagram of the counter shown in FIG. 1.

In FIG. 2, the counter 8 is provided with a word counter 801 and a frame counter 802. The word counter 801 counts codes 00 to 99 corresponding to code words of one frame through input of the reference clock from the reference clock generator 7. The frame counter 802 counts frames 0 to 8 corresponding to frame values of one sequence in linkage with a carry of the word counter 801. When a synchro-establishment signal from the synchronizing signal detector 4 is inputted into the word counter 801 and the frame counter 802, their count values are respectively set as a word value and a frame value which have been predetermined and contain a word synchronizing signal. In this manner, a word synchronization and a frame synchronization are established. The count values of the word counter 801 and the frame counter 802 are supplied to the controller 9.

Figure 3:
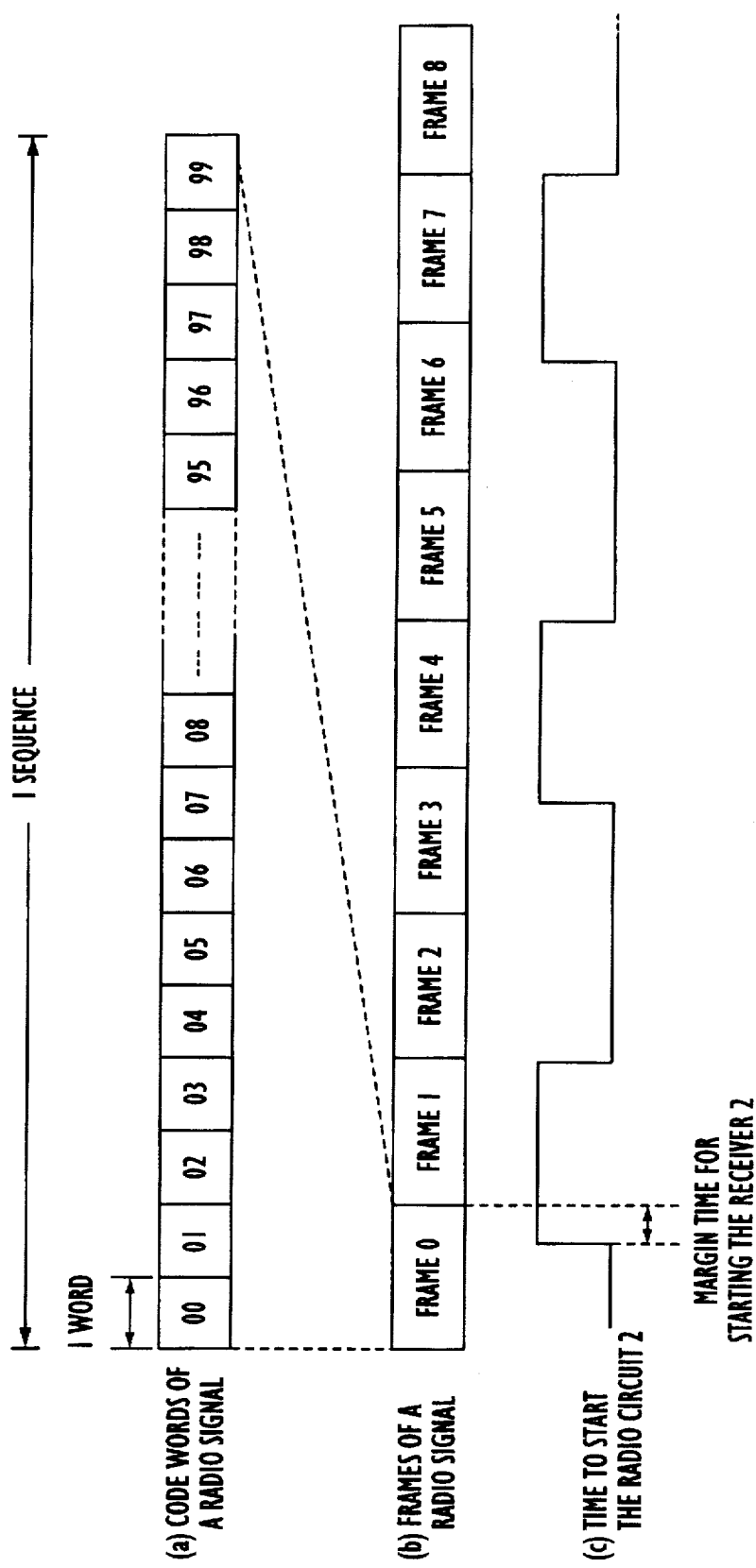
FIGS. 3(a) and 3(b) show a signal format showing an example of signals used in the embodiment.
FIG. 3(c) is a timing chart for explaining a margin time for starting the radio circuit shown in FIG. 1 to receive a self-frame.

Next, a signal format showing an example of radio signals used in the invention and a margin time for starting the radio circuit 2 are described using FIGS. 3(a) to 3(c).

FIG. 3(a) shows code words contained in one of frames composing a radio signal, FIG. 3(b) shows frames of the radio signal, and FIG. 3(c) shows a margin time for starting the radio circuit 2.

In FIGS. 3(a) and 3(b), one sequence of a radio signal is composed of nine frames 0 to 8 and each frame is composed of 100 code words 00 to 99.

A synchronizing signal is composed of a word synchronizing signal, a frame synchronizing signal, and a frame information signal, and for example a word synchronizing signal is contained in code words 00 to 01. A frame synchronizing signal is contained in code words 02 to 04 and a frame information signal is contained in code words 05 to 08. An identification signal is contained in code words on and after code word 09.

In FIG. 3(c), frames 1, 4, and 7 are frames assigned to a receiver. In consideration of a margin time for starting the radio circuit, the receiver starts the radio circuit 2 at a point of time earlier than the time to receive a frame assigned to the receiver itself.

Next, action for starting the radio circuit 2 is described using FIGS. 4(a) to 4(f).

Figure 4:
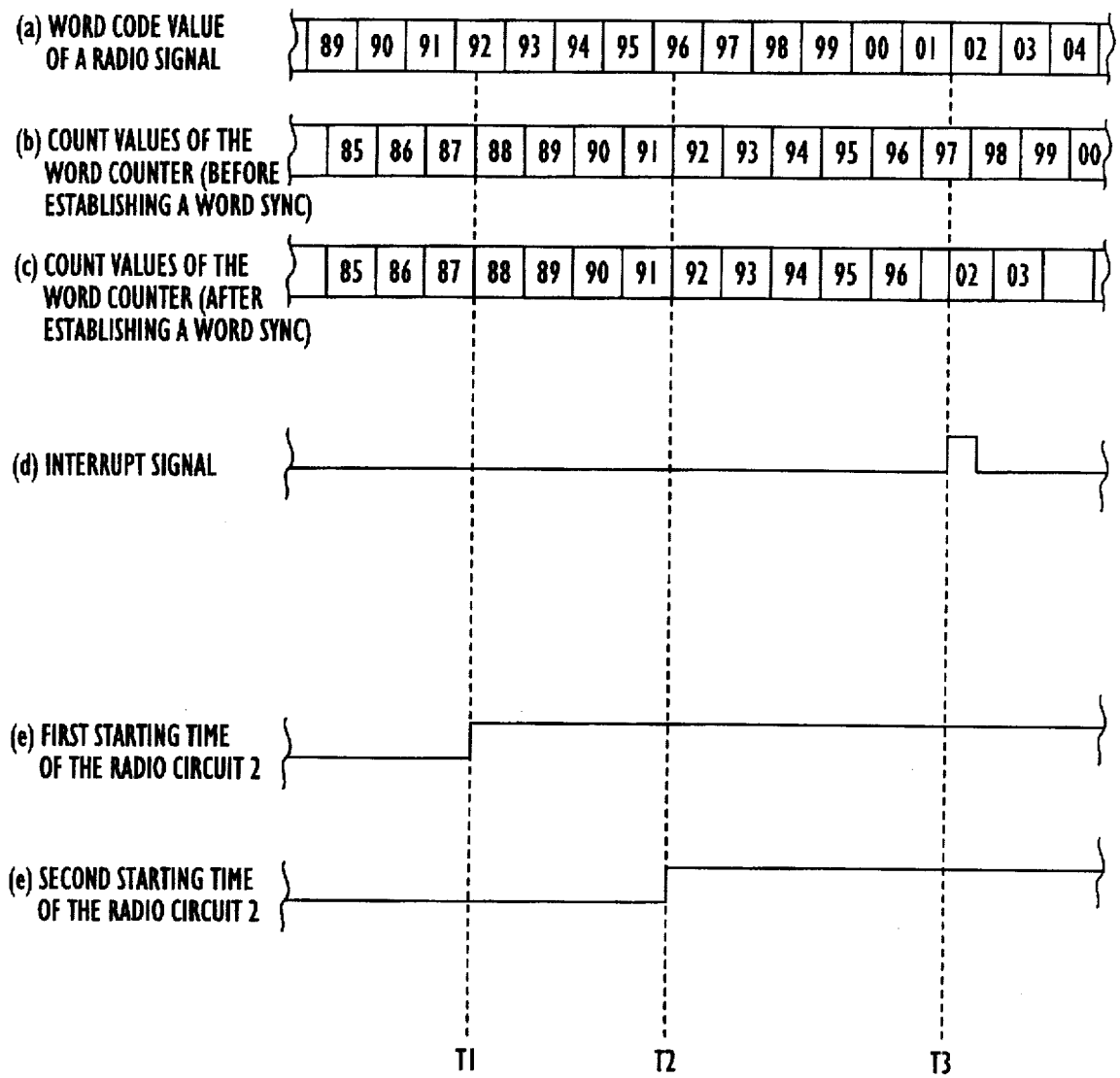
FIG. 4(a) shows code words having the signal format shown in FIG. 3(a).
FIGS. 4(b) and 4(c) shows count values of the word counter shown in FIG. 2.
FIG. 4(d) is a timing chart of an interrupt signal outputted from the synchronizing signal detector to the controller shown in FIG. 1.
FIGS. 4(e) and 4(f) are timing charts for explaining the first starting time and the second starting time to start the radio circuit shown in FIG. 1.

FIG. 4(a) shows code words composing one frame, FIGS. 4(b) and 4(c) show count values of the word counter 801 before and after establishing synchronization, respectively, FIG. 4(d) shows a point of time for the synchronizing signal detector 4 to output a synchronization detecting signal when detecting a word synchronizing signal, and FIGS. 4(e) and 4(f) show points of time to start the radio circuit 2.

In FIG. 4(b), the count value of the word counter 801 before establishing synchronization has an error of −4 code words in relation with the code words of the radio signal shown in FIG. 4(a).

On the other hand, the count value of the word counter 801 after establishing synchronization as shown in FIG. 4(c) is set as code word 02 to which a word synchronizing signal has been in advance assigned when inputting the synchronizing signal shown in FIG. 4(d) into the controller 9, namely, when establishing a word synchronization at the time T3.

In FIG. 4(e), when the first starting time to start the radio circuit 2, namely, a point of time to start the radio circuit 2 on the basis of a compensation value Z1 stored in the compensation value memory 12 has not been adjusted, the radio circuit 2 is started at the time T1 when the frame counter 802 counts a frame which is one frame before a self-frame and the count value of the word counter 801 becomes 88 in consideration of an expected maximum error so that the radio circuit 2 may surely receive a synchronizing signal. In this embodiment, the radio circuit 2 is started at a point of time when a count value of the word counter 801 is eight code words earlier than the synchronizing signal.

On the other hand, in FIG. 4(f), when the second starting time to start the radio circuit 2, namely, a point of time to start the radio circuit 2 on the basis of the compensation value Z1 is set, the radio circuit 2 is started at the time T2, for example, when the frame counter 802 counts a frame which is one frame before a self-frame and the count value of the word counter 801 becomes 92 in consideration of property of an error between the reference clock outputted from the reference clock generator 7 and the code words. In this start timing operation, when an error Z of the count value of the word counter 801 to the code word value is consecutively detected at k times where k is predetermined, the receiver stores this error as a compensation value Z1, and after judging this as an error to the radio signal depending upon accuracy of the reference clock generator 7, the receiver starts the radio circuit 2 as considering a count value corresponding to the compensation value Z1 as a margin time for starting the radio circuit 2.

In comparison with the first starting time to start the radio circuit 2, the second starting time to start the radio circuit 2 improves a battery saving effect by a time of (T2−T1).

In relation with detection of an error between a code word value of a radio signal and a count value of the word counter 801, and in relation with a point of time to start the radio circuit 2 according to the invention as described above, the functional block diagram shown in FIG. 1 is described in the following, using FIGS. 5(a) to 5(d) and FIGS. 6 (a) to 6 (d).

In this embodiment, it is assumed that the number k of consecutive error occurrences stored in the number-of-consecutive-error-occurrences memory 11 is set as 2.

In FIG. 1, when the unshown power supply is turned on, the controller 9 starts the radio circuit 2 at the time Ta by outputting a radio circuit controlling signal. At this time, a frame value of the radio signal is 6, a code word value of it is 50, and a count value of the word counter 801 is 16 (FIG. 5(d)). Also, the controller 9 turns on the synchronizing signal detector 4. Furthermore, the controller 9 sets an internal flag I as I=0 to recognize that power is on.

The internal flag I, which shows the number of times at which an error between a code word detected by the controller 9 and a count value of the word counter 802 is consecutively detected, shows that power is on when I=0. The internal flag I=1 shows that a word synchronization and a frame synchronization between a radio signal and the counter 8 have been established for the first time. And the internal flag I=2 shows that an error has been detected once, and I=3 shows that an error having the same value has been consecutively detected twice. As applying the same rule to the following, the internal flag I=N+1 shows that an error having the same value has been consecutively detected at N times.

When the radio circuit 2 is started by turning power on, the receiver receives a radio signal through the antenna 1 and amplifies it, demodulates it, and shapes its waveform by means of the radio circuit 2 and the waveform shaping circuit 3. The receiver detects a word synchronizing signal contained in a synchronizing signal by means of the synchronizing signal detector 4.

The synchronizing signal detector 4 outputs a synchro-detection signal to the controller 9 when detecting a word synchronizing signal from code words 00 to 01 of a self-frame 7 (FIG. 5(b)). In response to this, the controller 9 detects a count value 68 of the word counter 801 at the time Tb (FIG. 5(c)).

After outputting the synchro-detection signal, the synchronizing signal detector 4 outputs a synchro-establishment signal to the word counter 801 and establishes a word synchronization immediately after the time Tb. By this operation, the count value of the word counter 801 is changed from 68 to 02 to be equal to the code word value of the radio signal.

The synchronizing signal detector 4 detects a frame synchronizing signal following the word synchronizing signal and detects that the code word being currently received is frame 7 on the basis of a fact that this frame synchronizing signal shows the frame 7. By this detection the synchronizing signal detector 4 outputs a synchro-establishment signal to the counter 8, sets a count value of the frame counter 802 as "0", and establishes a frame synchronization with the radio signal.

The controller 9 detects that self-frames are frames 1, 4 and 7 by inputting a frame information signal which follows the frame synchronizing signal and is detected by the synchronizing signal detector 4. Next, the controller 9 sets the internal flag as I=1 and recognizes that a synchronization between the counter 8 composed of the word counter 801 and the frame counter 802 and a radio signal has been established for the first time.

After setting the internal flag I as I=1, the controller 9 turns off the synchronizing signal detector 4 and turns on the coincidence detector 6. The coincidence detector 6 reads the own identification call number addressed by the controller 9 from the identification number memory 5 and compares it with an identification signal at the time Tc. In case that both of them coincide with each other in this comparison, the coincidence detector 6 outputs a coincidence signal to the controller 9, and the controller 9 outputs an alerting driver signal to the driver 13. In response to this alerting driver signal, the alerting-driver 13 outputs an alerting signal and the paging circuit 14 makes an alerting operation. In case that a coincidence signal is not inputted into the controller 9 even after a frame assigned to the receiver itself has finished to be received, the controller 9 outputs a radio circuit controlling signal and turns off the radio circuit 2 (FIG. 5(d)).

After synchronization between the counter 8 and a radio signal has been established, the word counter 801 begins counting the reference clock sent from the reference clock generator 7 with a count value 02. When the word counter 801 counts up to 99, its count value returns to 00 and at the same time a count value of the frame counter 802 becomes 8 from 7 because of a carry. Still after this, the word counter 801 keeps counting the reference clock and the controller 9 detects the first starting time to start the radio circuit 2, namely, the time when a count value of the word counter 801 becomes 88 and a count value of the frame counter 802 becomes 0, and the controller 9 starts the radio circuit 2 at the time Td.

After the radio circuit 2 is started, a radio signal is inputted into the synchronizing signal detector 4 turned on by the controller 9 through the antenna 1, the radio circuit 2, and the waveform shaping circuit 3. The synchronizing signal detector 4 detects a word synchronizing signal out of the inputted radio signal and outputs a synchro-detection signal, and at the time Te the controller 9 detects a count value 97 of the word counter 801 at this time. Since the controller 9 grasps that the word synchronizing signal is contained in the code words 00 to 01 and a synchro-detection signal is inputted immediately after receiving the code word 02, the controller 9 detects an error Z between the code word value and the count value of the word counter 802, where Z=−5. The detected error Z is stored in the error memory 5 as an error Z0, and at the same time the controller 9 sets the internal flag as I=2 and recognizes that the error has been detected once.

After outputting a synchro-detection signal, the synchronizing signal detector 4 sets a count value of the word counter 801 as 02 immediately after the time Te and establishes a word synchronization.

Figure 5:
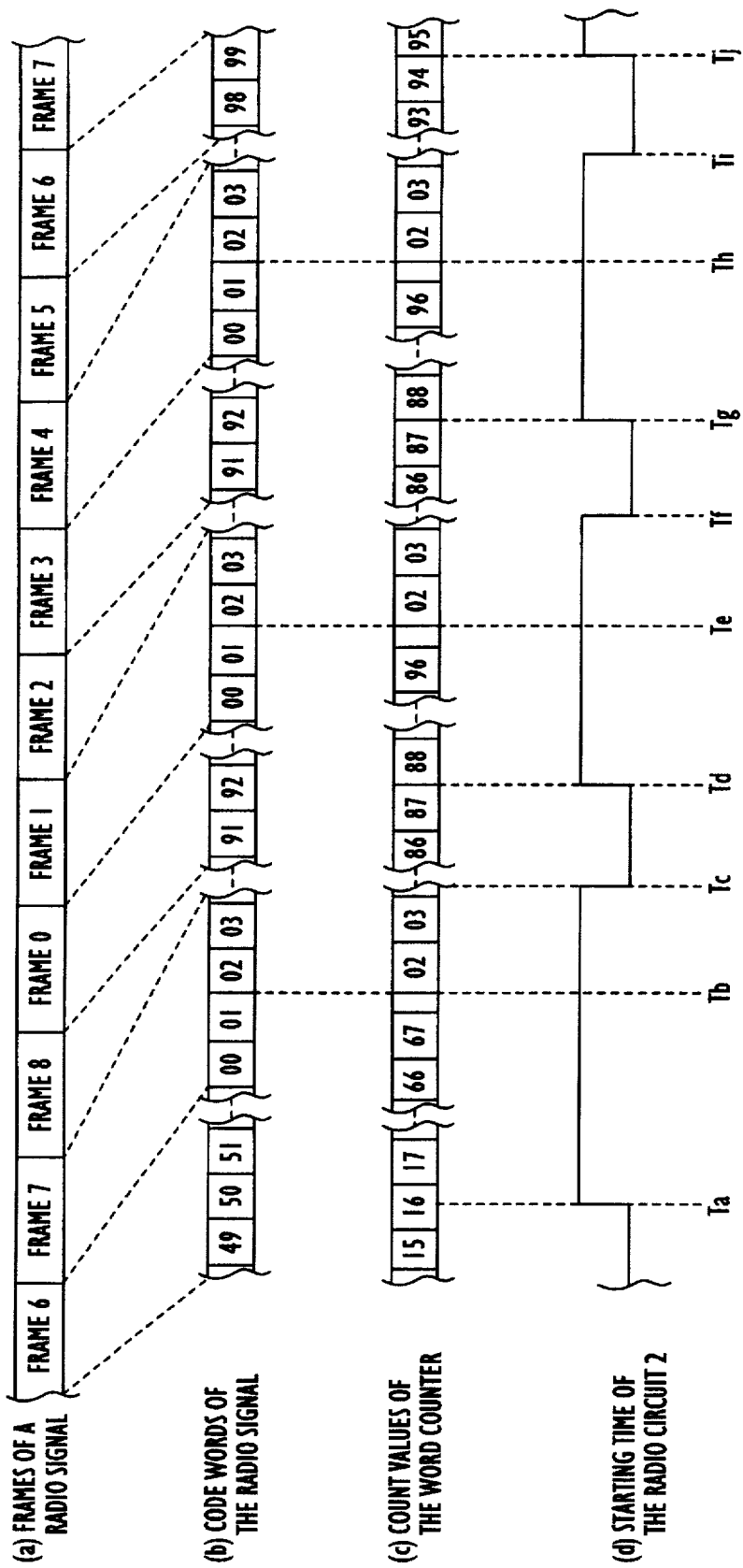
FIGS. 5(a) and 5(b) show code words and frames having the signal format shown in FIGS. 3(a) and 3(b).
FIG. 5(c) shows count values of the word counter shown in FIG. 2.
FIG. 5(d) is a timing chart for explaining an on-off action of the radio circuit shown in FIG. 1.
Figure 6:
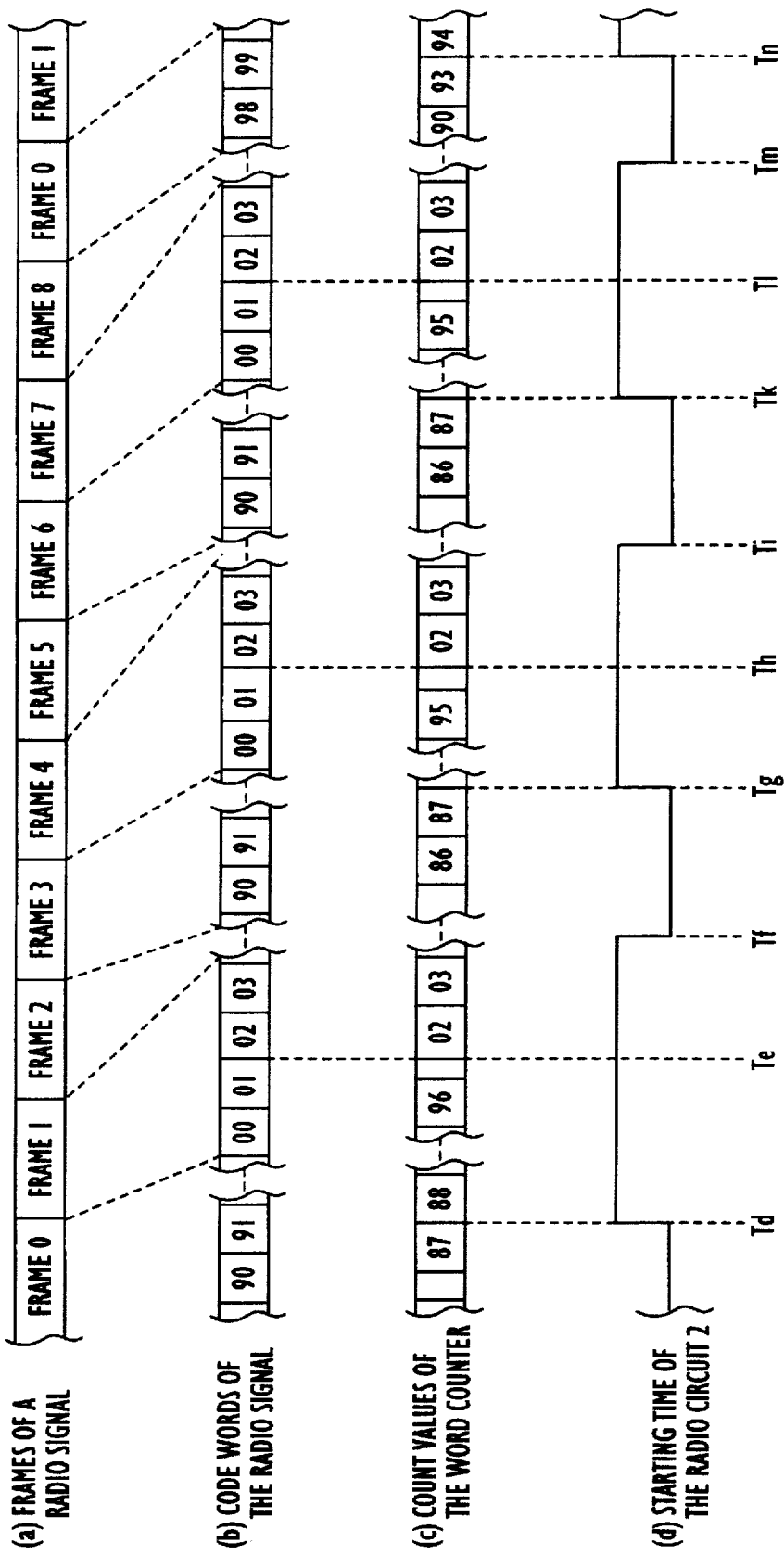
FIGS. 6(a) and 6(b) shows code words and frames having the signal format shown in FIGS. 3(a) and 3(b).
FIG. 6(c) shows count values of the word counter shown in FIG. 2.
FIG. 6(d) is a timing chart for explaining an on-off action of the radio circuit shown in FIG. 1.

And then the synchronizing signal detector 4 detects a frame detecting signal, sets a count value of the frame counter 802 as 01 immediately after the time Te, and establishes a frame synchronization. In FIG. 5, though not shown, an error between a count value and a frame value of the frame counter 802 does not occur.

After establishing a frame synchronization, the controller 9 turns off the synchronizing signal detector 4 and turns on the coincidence detector 6. The coincidence detector 6 reads the own identification number addressed by the controller 9 from the identification number memory 5 and compares it with an identifidation signal at the time Tf. In case that both of them coincide with each other in this comparison, the coincidence detector 6 outputs a coincidence signal to the alarting driver 13. In response to this alerting driver signal, the alerting driver 13 outputs an alerting signal and the controller 9, and the controller 9 outputs an alerting driver signal to the circuit 14 makes an alerting operation. In case that a coincidence signal is not inputted into the controller 9 even after a frame assigned to the receiver itself has finished to be received, the controller 9 outputs a radio circuit controlling signal and turns off the radio circuit 2.

After judging that the detected identification signal and the own identification number coincide with each other, the controller 9 outputs a radio circuit controlling signal and turns off the radio circuit 2.

In receiving a frame assigned to the receiver itself at the next time, namely, in receiving the frame 4, the receiver starts the radio circuit 2 at the time Tg, when a count value of the frame counter is 3 and a count value of the word counter is 88 at the time to start the radio circuit 2 equivalent to the time to receive the frame 1.

And with establishing a synchronization with the radio signal as described above, the controller 9 detects an error Z between a code word and a count value of the word counter 801 at the time Th. Since the count value of the word counter 801 is 97, the error Z at this time is Z=−5.

The controller 9 compares the error Z0 detected when receiving the frame 1 which is stored in the error memory 10 with the error Z detected when receiving the frame 4, and detects that both of them are −5 and coincide with each other. When detecting the coincidence, the controller 9 sets the internal flag as I=3 and recognizes that an error having the same value has been consecutively detected twice. Furthermore, the controller 9 reads the number k of consecutive occurrences of an error stored in the number-of-consecutive-error-occurrences memory 11, calculates "I−1= 2" in relation with the internal flag I, and then judges whether or not this calculated "I−1=2" and the number k of consecutive occurrences of an error stored in the number-of-consecutive-errors memory 11 coincide with each other.

Now, supposing that the number k of consecutive occurrences of an error stored in the number-of-consecutive-error-occurrences memory 11 is k=2, the controller 9 judges that the calculated number of consecutive occurrences of an error having the same value and the number k of consecutive occurrences of an error stored in the number-of-consecutive-error-occurrences memory 11 coincide with each other and stores the error "Z0=−5" stored in the error memory 10 into the compensation value memory 12 as a compensation value Z1, and after this the controller 9 does not make an error detection. Error detection may be made each time a self-frame is received, but stopping the error detection makes it possible to reduce the power consumption.

As for the starting time to start the radio circuit 2 for receiving the next self-frame 7, the controller 9 reads the compensation value "Z1=−5" stored in the compensation value memory 12 and starts the radio circuit 2 at the time when the starting time to start the radio circuit 2 is advanced by a count value of the word counter 801 corresponding to the compensation value "Z1=−5", namely, at the time Tj when a count value of the word counter 801 is 95 and a count value of the frame counter 802 is 6.

After this, the controller 9 starts the radio circuit 2 when the word counter 801 counts 95 and the frame counter 802 counts a value which is one frame before the self-frame to receive.

FIGS. 6(a) to 6(d) are timing charts for explaining a starting operation of the radio circuit 2 showing an embodiment of the invention, respectively, in the same manner as FIGS. 5(a) to 5(d), where the number k of consecutive occurrences of an error is set as 2 in the same manner as FIGS. 5(a) to 5(d). While FIGS. 5(a) to 5(d) explain a case that errors detected by the controller 9 for the first time and the second time are equal to each other, FIGS. 6(a) to 6(d) show a case that the first detected error and the second detected error are different from each other and the second detected error and the third detected error coincide with each other.

In FIGS. 6(a) to 6(d), a method for establishing synchronization in the counter 8 and a radio signal after turning power on is not described to avoid repetition, since it was described in FIGS. 5(a) to 5(d).

The time to start the radio circuit 2 for receiving a self-frame for the first time, namely, for receiving frame 1 is the time Td when a count value of the word counter 801 is 88 and a count value of the frame counter 802 is 0.

An error Z which is detected by the controller 9 at the second time of establishing a word synchronization at the time Te is Z=−5, and at this time the controller 9 sets the internal flag I as I=2 and stores the error Z=−5 as Z0=−5 in the error memory 10.

Reception of the next frame 4 is made at the time Tg when a count value of the word counter 801 is 88 and a count value of the frame counter 802 is 3.

An error Z detected at the time Th in reception of the frame 4 is Z=−6. At this time, the controller 9 compares the error Z with the error Z0=−5 detected in reception of the frame 1 which is stored in the error memory 10. The controller 9 judges that both of them do not coincide with each other and rewrites a value −5 of the error Z0 stored in the error memory 10 with a value −6, as keeping the internal flag I as I=2.

The next reception, namely, reception of the frame 7 is started at the time Tk in the same timing as frames 1 and 4. Since a count value of the word counter 801 is 97, an error Z detected at the time T1 in reception of the frame 7 is Z=−6. At this time the controller 9 reads the error Z0 detected in reception of the frame 4 which is stored in the error memory 10 and compares it with the currently detected error Z. The controller 9 judges that both of them coincide with each other and sets the internal flag I as I=3. Next, the controller 9 reads the number k of consecutive occurrences of an error having the same value which is stored in the number-of-consecutive-error-occurrences memory 11 and compares the number k with the number of consecutive occurrences of the error Z having the same value. The controller 9 calculates I−1=2 in relation with the internal flag I, recognizes that an error having the same value has been consecutively detected twice, and judges that the number coincides with the number k=2 stored in the number-of-consecutive-error-occurrences memory 11. The controller 9 writes the error Z0=−6 stored in the error memory 10 as a compensation value Z1 into the compensation value memory 12.

After this, the controller 9 makes no error detection and starts the radio circuit 2 on the basis of the compensation value Z1=−6 stored in the compensation value memory 12 when a count value of the word counter 801 is 94 and a count value of the frame counter 802 is 0, and starts the radio circuit 2 at the time Tm in reception of the frame 1, for example.

In this manner, the receiver of this embodiment can start the radio circuit 2 by means of the controller 9 on the basis of a compensation value Z1 stored in the compensation value memory 12, but also the receiver can be made so that data stored in the compensation value memory 12 may not be eliminated even when the power of the receiver is turned off and the radio circuit 2 may be started on the basis of the compensation value Z1 when power is turned on at the next time.

Next, action of the controller 9 is described in the following as using FIG. 7.

Figure 7:
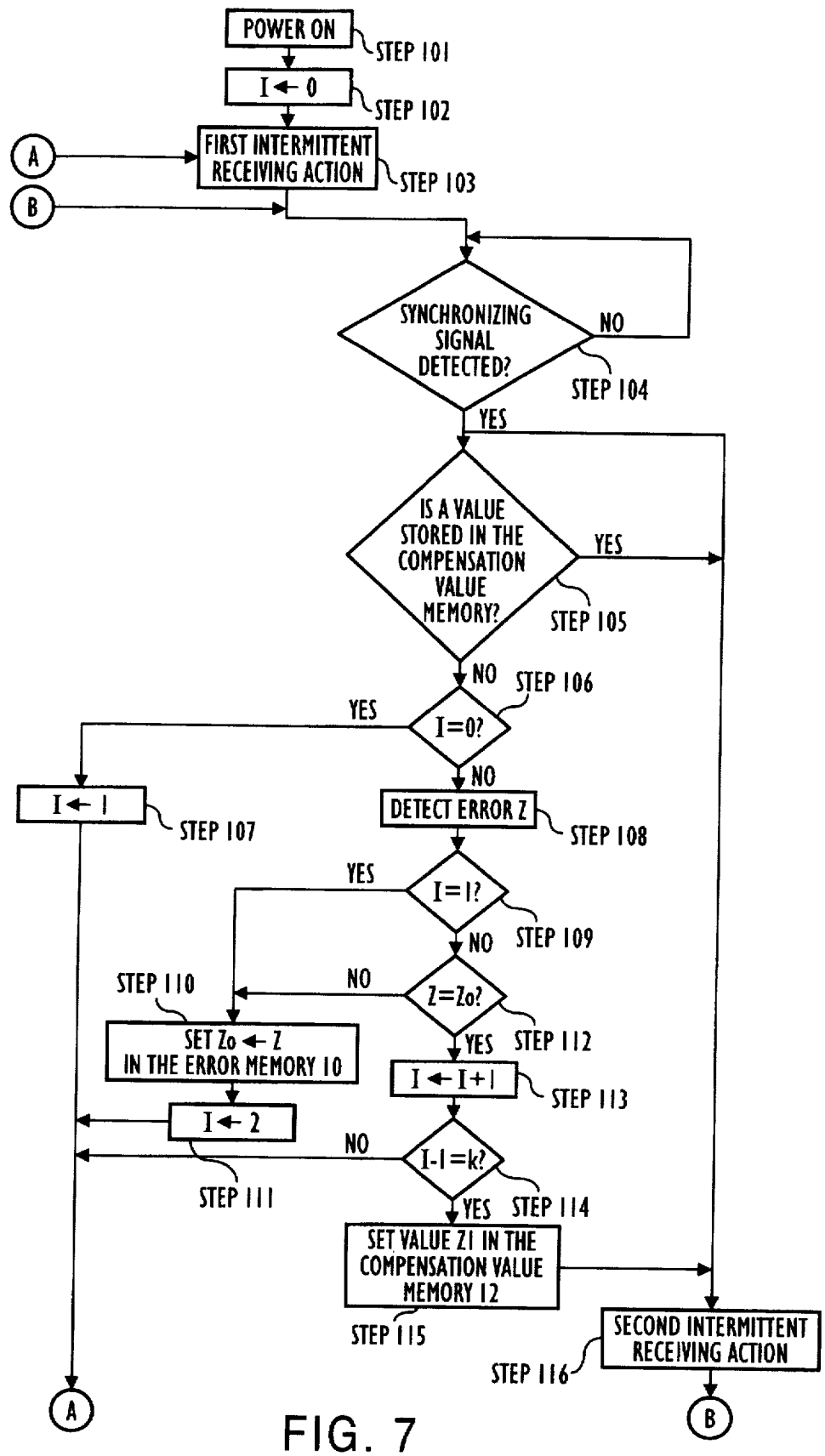
FIG. 7 is a flowchart for explaining a method for setting a point of time to start the radio circuit shown in FIG. 1.

In FIG. 7, first, when power is turned on (Step 101), the controller 9 sets the internal flag I as I=0 (Step 102). After this the first intermittent receiving action is continued until the radio circuit 2 is started for receiving the next self-frame (Step 103). This first intermittent receiving action means an intermittent receiving action where the radio circuit 2 is started at the above-mentioned first starting time of the radio circuit 2 when the intermittent receiving action is finished.

When the radio circuit 2 is started at the first starting time, the receiver detects of a synchronizing signal (Step 104).

When no synchronizing signal is detected, the receiver returns to a process of Step 104. After detecting a synchronizing signal, the controller 9 judges whether or not a compensation value Z1 is stored in the compensation value memory 12 (Step 105). When it is not stored, the controller 9 judges whether or not the internal flag I is I=0 (Step 106). When the internal flag I is I=0, the controller 9 sets the internal flag I as I=1 (Step 107) and returns to a process of Step 103 to enter the first intermittent receiving action.

On the other hand, when the internal flag I is not 0, the controller 9 makes a detection of an error Z (Step 108).

When an error Z is detected, the controller 9 judges whether or not the internal flag I is I=1 (Step 109). When the internal flag I is I=1, the detected error Z is written as Z0 into the error memory 10 (Step 110). After this writing, the controller 9 sets the internal flag I as I=2 (Step 111) and returns to a process of Step 103 to enter the first intermittent receiving action.

On the other hand, when the internal flag I is not I=1, the controller 9 judges whether or not the value Z0 stored in the error memory 10 coincides with the detected error Z (Step 112). When they do not coincide with each other, the controller 9 proceeds to a process of the above-mentioned Step 110. When both of them coincide with each other, the controller 9 increments the internal flag I by 1 (Step 113) and judges whether or not a value of "I−1" in relation with the internal flag I and the number k of consecutive occurrences of an error stored in the number-of-consecutive-error-occurrences memory 11 coincide with each other (Step 114). When they coincide with each other, the controller 9 writes an error Z at this time as a compensation value Z1 into the compensation value memory 12 (Step 115) and performs the above-mentioned second intermittent receiving action (Step 116). And after this second intermittent receiving action, the controller 9 starts the radio circuit 2 at the second starting time of the radio circuit 2 and proceeds to a process of Step 104. On the other hand, when both of them do not coincide with each other in a process of Step 114, the controller 9 proceeds to a process of the above-mentioned Step 103 and repeats this action until a compensation value Z1 is stored in the compensation value memory 12.

And when a compensation value Z1 is stored in the compensation value memory 12 in a process of Step 105, the controller 9 proceeds to a process of the above-mentioned Step 116.

Figure 8:
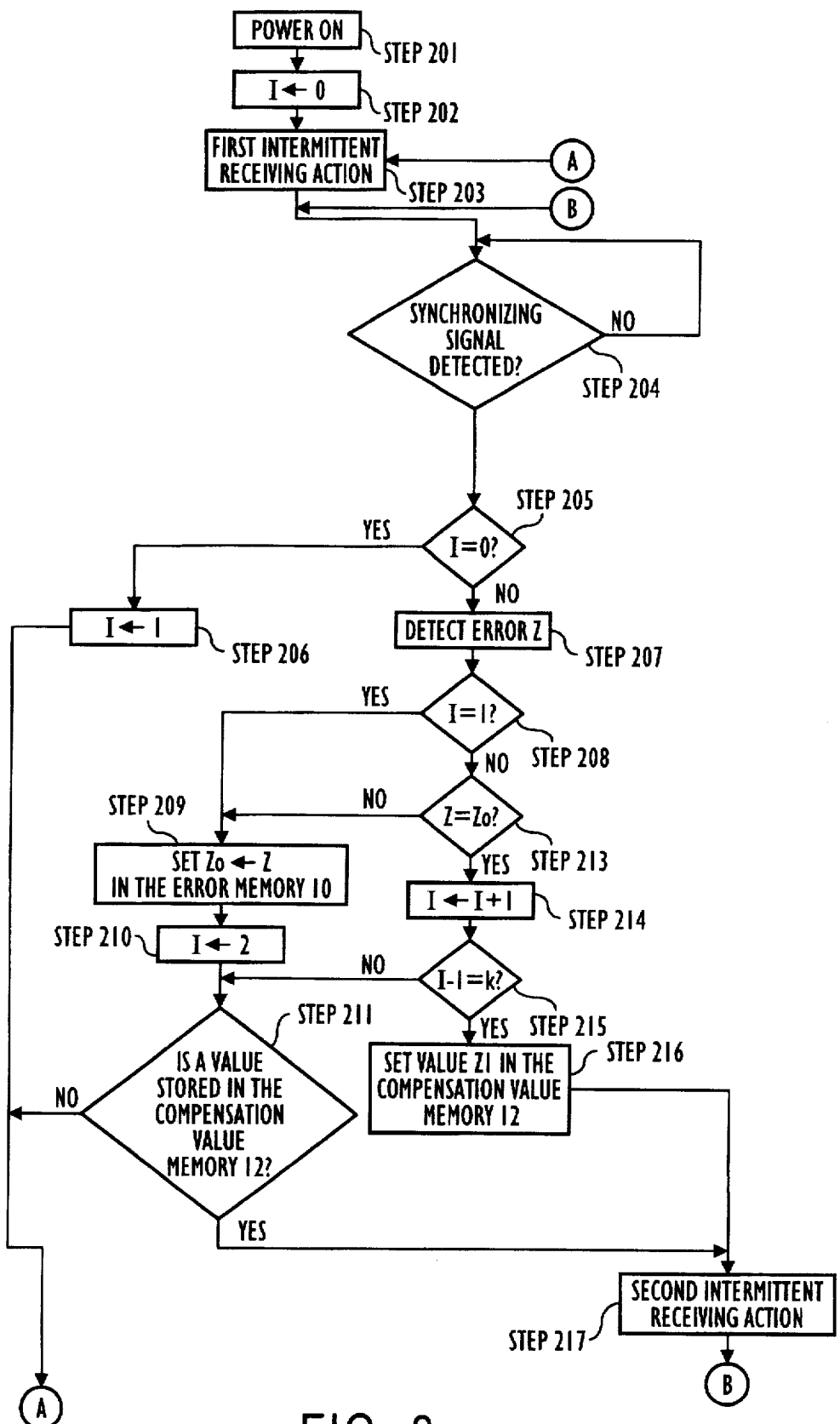
FIG. 8 is a flowchart for explaining another embodiment having another method for setting a point of time to start the radio circuit shown in FIG. 1.

Next, another embodiment of a control process of the controller 9 of the invention is described using a flowchart in FIG. 8.

The second embodiment makes a detection of an error Z even after a compensation value Z1 is stored in the compensation value memory 12, and rewrites the compensation value Z1 at any time.

When power is turned on (Step 201), the controller sets the internal flag I as I=0 (Step 202). Then the above-mentioned first intermittent receiving action is continued until the radio circuit 2 is started for receiving the next self-frame (Step 203).

When the radio circuit 2 is started, the receiver makes a detection of a synchronizing signal (Step 204). When no synchronizing signal is detected, the receiver returns to a process of Step 204. When a synchronizing signal is detected, the controller 9 judges whether or not the internal flag I is I=0 (Step 205). When the internal flag I is 0, the controller 9 sets I=1 (Step 206) and proceeds to a process of Step 203.

On the other hand, when the internal flag I is not I=0, the controller 9 detects an error Z (Step 207) and judges whether or not the internal flag I is I=1 (Step 208).

When the internal flag I is I=1, the controller 9 writes the detected error Z as Z0 into the error memory 10 (Step 209). After this writing, the controller 9 sets the internal flag I as I=2 (Step 210), and judges whether or not a compensation value Z1 is stored in the compensation value memory 12 (Step 211).

When a compensation value Z1 is not stored in it, the controller 9 proceeds to a process of the above-mentioned Step 203. On the other hand, when a compensation value Z1 is stored, the controller 9 performs the second intermittent receiving action on the basis of the stored compensation value Z1 (Step 212) and proceeds to a process of the above-mentioned Step 204.

In a process of Step 208, when the internal flag I is not I=1, the controller 9 judges whether or not the error Z0 stored in the error memory 10 and the detected error Z coincide with each other (Step 213). When they do not coincide with each other, it proceeds to a process of the above-mentioned Step 209, and when they coincide with each other, it increments the internal flag I by 1 (Step 214). After this increment, the controller 9 calculates a value of "I−1" in relation with the internal flag I and judges whether or not this value and the number k of consecutive error occurrences stored in the number-of-consecutive-error-occurrences memory 11 coincide with each other (Step 215). In this judgement, when they do not coincide with each other, the controller 9 proceeds to a process of the above-mentioned Step 211, and when they coincide with each other, the controller 9 stores the error Z as a compensation value Z1 in the compensation value memory 12 (Step 216), and then proceeds to a process of the above-mentioned Step 212.

The embodiment shown in FIG. 8 continues a detecting action of an error Z even after a compensation value Z1 has been stored in the compensation value memory 12. And even if the value of error Z is changed in the middle of a receiving process, unless the changed value is consecutively repeated by a predetermined number of times k, this embodiment starts the radio circuit 2, keeping a margin time for starting the radio circuit 2 as the same value as the last receiving action. And if the changed value is repeated consecutively at k times, each time it is, the controller 9 determines the starting time of the radio circuit 2 for receiving the next self-frame. Therefore, this embodiment makes it possible to dynamically compensate a frame length to some degree.

By being provided with a bit counter in the counter, the invention makes it possible to not only compensate a frame length in words but also detect an error between a radio signal and a count value in bits and compensate the starting time of the radio circuit 2 in bits.

And it is a matter of course that the invention can be applied to any system which has a signal format for a selective-calling receiver of any system such as a POCSAG, ERMES, or NTT system.

As mentioned above, an apparatus and a method for controlling an intermittent reception time of a radio equipment according to the invention detect a synchronization error between a count value of the word counter and a code word of a radio signal, judge that the detected error is definite only in case that it occurs consecutively at a predetermined number of times, and compensate a margin time for starting the radio circuit. Therefore, even in case that the reference clock from the reference clock generator is greatly changed in frequency and a count value of the word counter is greatly changed because of a sudden change in the temperature, the invention does not set the time to receive a self-frame on the basis of such a sudden change in the count value as this and therefore the invention can correctly set the time to receive the self-frame.

An intermittent receiving circuit and an intermittent receiving method of a selective-calling receiver according to the invention can reduce the power consumption, since they compensate a margin time for starting the radio circuit when a detected error occurs consecutively at a predetermined number of times and make no error detection after this compensation.

Furthermore, without being limited to a selective-calling receiver, the invention can be applied to any radio equipment which establishes synchronization with a radio signal and makes an intermittent receiving action.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. An apparatus for controlling an intermittent reception time in radio equipment, comprising:
   oscillating means for generating a reference clock;
   a counter for counting said reference clock;
   receiving means for receiving a radio signal composed of plural frames and outputting a received signal;
   synchronizing signal detecting means for detecting a synchronizing signal out of said received signal;
   detecting means for detecting an error between a code word value of said received signal and a count value of said counter, responding to detection of said synchronizing signal; and
   adjusting means for adjusting a margin time for starting said receiving means for receiving a frame assigned to said radio equipment in case that said detecting means has consecutively detected said error at a predetermined number of times.

2. The apparatus for controlling the intermittent reception time in radio equipment as claimed in claim 1, further comprising:
   inhibiting means for inhibiting said detecting means from detecting an error after said adjusting means has adjusted said margin time for starting said receiving means.

3. The apparatus for controlling the intermittent reception time in radio equipment as claimed in claim 1, wherein said adjusting means comprises:
   error storing means for storing said error detected by said detecting means;
   number-of-consecutive-error-occurrences storing means for storing said number of times at which said error is to be consecutively detected;
   rewriting means for newly rewriting an error stored in said error storing means when said error stored in said error storing means and said error detected by said detecting means do not coincide with each other;
   error coincidence detecting means for detecting coincidence between said error stored in said error storing means and said error detected by said detecting means;
   number-of-times coincidence means for outputting a number-of-times coincidence signal through detecting coincidence between said number of coincidences detected by said error coincidence detecting means and said number of consecutive error occurrences stored in said number-of-consecutive-error-occurrences storing means; and
   starting margin time adjusting means for adjusting said margin time for starting said receiving means for receiving a said frame assigned to said radio equipment, responding to said number-of-times coincidence means.

4. The apparatus for controlling the intermittent reception time in radio equipment as claimed in claim 1, wherein said counter comprises:
   a word counter for counting said reference clock; and
   a frame counter operated by a carry of said word counter.

5. A selective-calling receiver comprising:
   oscillating means for generating a reference clock,
   a counter for counting said reference clock;
   receiving means for receiving a radio signal composed of plural frames and outputting a received signal;
   synchronizing signal detecting means for detecting a synchronizing signal out of said received signal;
   error detecting means for detecting an error between a code word value of said received signal and a count value of said counter, responding to detection of said synchronizing signal;
   adjusting means for adjusting a margin time for starting said receiving means for receiving a frame assigned to said selective-calling receiver in case that said error-detecting means has consecutively detected said error at a predetermined number of times;
   identification number coincidence detecting means for detecting an identification signal out of said received signal, detecting coincidence between said identification signal and a predetermined own identification number, and outputting a coincidence signal; and
   alerting means for making an alerting operation in response to said coincidence signal.

6. The selective-calling receiver as claimed in claim 5, further comprising:
   inhibiting means for inhibiting said detecting means from detecting said error after said adjusting means has adjusted said margin time for starting said receiving means.

7. The selective-calling receiver as defined in claim 5, wherein said adjusting means comprises:
   error storing means for storing said error detected by said detecting means;
   number-of-consecutive-error-occurrences storing means for storing said number of times at which said error is to be consecutively detected;
   rewriting means for newly rewriting said error stored in said error storing means when said error stored in said error storing means and said error detected by said detecting means do not coincide with each other;
   error coincidence detecting means for detecting coincidence between said error stored in said error storing means and said error detected by said detecting means;
   number-of-times coincidence means for outputting a number-of-times coincidence signal through detecting coincidence between said number of coincidences detected by said error coincidence detecting means and said number of consecutive error occurrences stored in said number-of-consecutive-error-occurrences storing means; and
   starting margin time adjusting means for adjusting said margin time for starting said redeiving means for receiving said frame assigned to said selective-calling receiver; responding to said number-of-times coincidence means.

8. The selective-calling receiver as claimed in claim 5, wherein said receiving means comprises:

an antenna for receiving said radio signal;

amplifying means for using output from the antenna as input, amplifying said radio signal, and outputting an amplified signal;

demodulating means for demodulating said amplified signal and outputting a demodulated signal;

waveform shaping means for shaping waveform of said demodulated signal and outputting a digital signal as said received signal; and power controlling means for making an on-off control of supplying power to said receiving means as being controlled by the adjusting means.

9. The selective-calling receiver as claimed in claim 5, wherein said counter comprises:

a word counter for counting said reference clock; and a frame counter operated by a carry of said word counter.

10. A method for controlling an intermittent reception time in radio equipment, comprising the steps of:

supplying power to a receiving means for receiving a radio signal;

detecting a synchronizing signal out of said radio signal;

judging whether or not a compensation value for adjusting a time to supply the power to said receiving means is stored in a compensation value storing means;

setting said time to supply the power to said receiving means on the basis of said compensation value when said compensation value is stored in said compensation value storing means;

detecting an error between said radio signal and a count value of an internal counter of said radio equipment when said compensation value is not stored in said compensation value storing means;

judging whether or not an already stored error exists, responding to detection of said error;

storing said detected error in said error storing means when the already stored error does not exist;

judging whether or not said detected error and said already stored error coincide with each other when said already stored error exists in said error storing means;

rewriting said error stored in said error storing means with said detected error when said already stored error does not coincide with said detected error;

judging whether or not a predetermined number of consecutive error occurrences and a number of error coincidences coincide with each other when said already stored error and said detected error coincide with each other; and storing said error stored in said error storing means into said compensation value storing means as a compensation value when both of a predetermined number of consecutive error occurrences and said number of error coincidences coincide with each other in judging coincidence of both of the numbers.

11. The method for controlling an intermittent reception time in radio equipment as claimed in claim 10, further comprising the step of:

inhibiting detection of said error between said radio signal and said count value of said internal counter of said radio equipment after storing said compensation value into said compensation value storing means.

12. The method for controlling an intermittent reception time in radio equipment as claimed in claim 10, further comprising the steps of:

detecting an identification number out of said radio signal;

judging whether or not said detected identification signal and a predetermined own identification number coincide with each other; and making an alerting operation when said detected identification number and said own identification number coincide with each other.

* * * * *

UNITED STATES PATENT AND TRADEMARK OFFICE
CERTIFICATE OF CORRECTION

PATENT NO.   : 5,765,104
DATED        : June 9, 1998
INVENTOR(S)  : Masayuki KUSHITA It is certified that error(s) appears in the above-identified patent and that said Letters Patent is hereby corrected as shown below:

Col. 10, line 20, change "97" to --96--.

Signed and Sealed this

Nineteenth Day of January, 1999

Attest:

Attesting Officer

*Acting Commissioner of Patents and Trademarks*